(12) United States Patent
Esenwein

(10) Patent No.: US 9,073,127 B2
(45) Date of Patent: Jul. 7, 2015

(54) RUNOFF SAFETY DEVICE

(75) Inventor: Florian Esenwein, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 13/881,892

(22) PCT Filed: Sep. 21, 2011

(86) PCT No.: PCT/EP2011/066380
§ 371 (c)(1),
(2), (4) Date: Jul. 13, 2013

(87) PCT Pub. No.: WO2012/055642
PCT Pub. Date: May 3, 2012

(65) Prior Publication Data
US 2013/0292915 A1    Nov. 7, 2013

(30) Foreign Application Priority Data
Oct. 29, 2010    (DE) .......................... 10 2010 043 188

(51) Int. Cl.
| B24B 41/04 | (2006.01) |
| B23B 31/00 | (2006.01) |
| B24B 23/02 | (2006.01) |
| B24B 45/00 | (2006.01) |
| B24B 55/00 | (2006.01) |
| B25F 5/00 | (2006.01) |
| B27B 5/32 | (2006.01) |

(52) U.S. Cl.
CPC ............. *B23B 31/008* (2013.01); *Y10T 279/32* (2015.01); *B24B 23/02* (2013.01); *B24B 41/042* (2013.01); *B24B 45/00* (2013.01); *B24B 55/00* (2013.01); *B25F 5/006* (2013.01); *B27B 5/32* (2013.01)

(58) Field of Classification Search
CPC ...... B24B 41/042; B24B 41/04; B24B 45/00; G01M 1/36; B24D 5/165
USPC .................................. 451/343, 344, 359, 295
See application file for complete search history.

(56) References Cited

U.S. PATENT DOCUMENTS

| 5,263,995 | A | * | 11/1993 | Mogilnicki et al. ......... 409/131 |
| 5,839,950 | A | * | 11/1998 | Johansson Edling et al. 451/359 |
| 6,409,584 | B1 | * | 6/2002 | Lin ............................... 451/295 |
| 6,464,572 | B2 | * | 10/2002 | Jansson ......................... 451/344 |
| 7,284,460 | B2 | * | 10/2007 | Yamamoto ................... 74/573.1 |
| 2004/0082283 | A1 | * | 4/2004 | Lindell et al. ................. 451/343 |

(Continued)

FOREIGN PATENT DOCUMENTS

| DE | 41 31 514 A1 | 3/1993 |
| DE | 44 26 969 A1 | 2/1996 |

(Continued)

OTHER PUBLICATIONS

International Search Report corresponding to PCT Application No. PCT/EP2011/066380, mailed Feb. 10, 2012 (German and English language document) (7 pages).

*Primary Examiner* — George Nguyen
(74) *Attorney, Agent, or Firm* — Maginot, Moore & Beck LLP

(57) ABSTRACT

A runoff safety device is configured to prevent runoff of at least one of a chucking element and a tool from a spindle in a braking mode. The runoff safety device has at least one transfer unit and an imbalance compensating unit configured to at least reduce an imbalance of the transfer unit in a mode.

11 Claims, 6 Drawing Sheets

(56) References Cited

U.S. PATENT DOCUMENTS

| | | | |
|---|---|---|---|
| 2005/0206217 A1* | 9/2005 | Koschel et al. | 301/5.22 |
| 2005/0250429 A1* | 11/2005 | Nomoto et al. | 451/359 |
| 2006/0065415 A1* | 3/2006 | Berg | 173/2 |
| 2007/0010179 A1* | 1/2007 | Lamprecht | 451/343 |

FOREIGN PATENT DOCUMENTS

| | | | |
|---|---|---|---|
| DE | 102006030163 A1 * | 1/2008 | G01M 1/36 |
| DE | 10 2010 014 393 A1 | 10/2011 | |
| EP | 2 239 550 A2 | 10/2010 | |
| JP | 55-147241 U | 10/1980 | |
| JP | 4-122572 A | 4/1992 | |
| JP | 10-71582 A | 3/1998 | |
| JP | 11-333692 A | 12/1999 | |
| JP | 2001-300841 A | 10/2001 | |
| JP | 2006-175547 A | 7/2006 | |
| JP | 2006-175554 A | 7/2006 | |
| WO | 02/097298 A1 | 12/2002 | |
| WO | 2011/120730 A1 | 10/2011 | |

\* cited by examiner

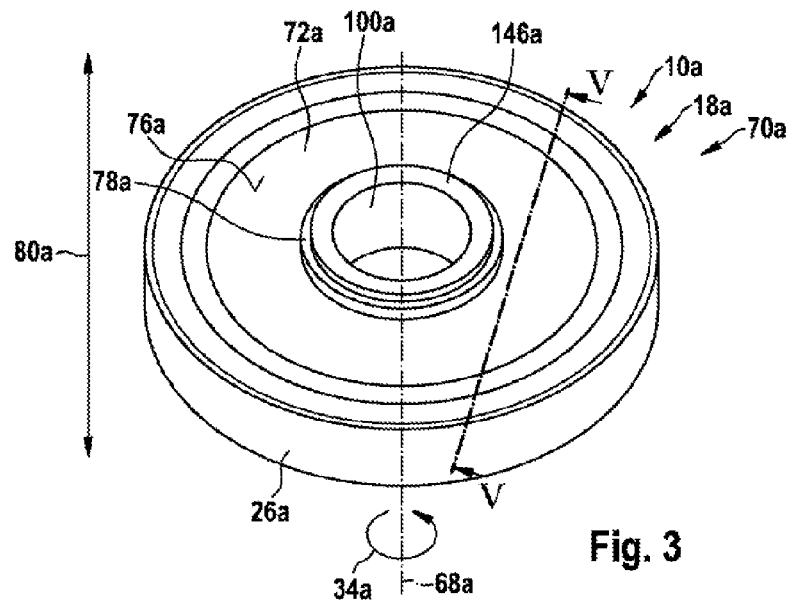
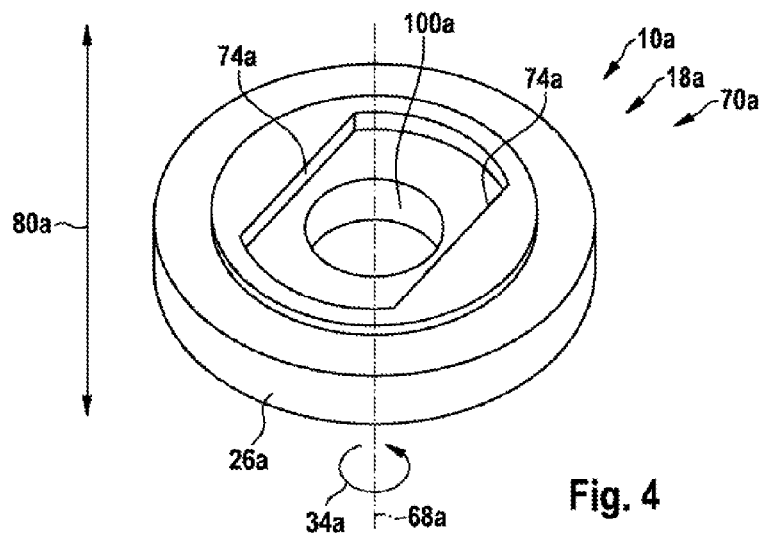

RUNOFF SAFETY DEVICE

This application is a 35 U.S.C. §371 National Stage Application of PCT/EP2011/066380, filed on Sep. 21, 2011, which claims the benefit of priority to Serial No. DE 10 2010 043 188.5, filed on Oct. 29, 2010 in Germany, the disclosures of which are incorporated herein by reference in their entirety.

BACKGROUND

Runoff safety devices for preventing runoff of a chucking element and/or of a tool from a spindle in a braking mode are already known which comprise a transfer unit.

SUMMARY

The disclosure is based on a runoff safety device, in particular a hand machine tool runoff safety device, for preventing runoff of a chucking element and/or of a tool from a spindle in a braking mode, having at least one transfer unit.

It is proposed that the runoff safety device have at least one unbalance compensating unit which is provided at least for reducing an unbalance of the transfer unit during operation. A "chucking element" is to be understood here as defining, in particular, a chucking nut or a chucking flange for screwing onto or unscrewing from the spindle, which chucking nut or chucking flange is provided for clamping the tool axially against the transfer unit. A "transfer unit" is to be understood here as meaning, in particular, a unit which is provided for transferring forces and/or torques from a drive, in particular a spindle of a hand machine tool to a tool. In this context, "provided" is to be understood as, in particular, specifically equipped and/or specifically configured. An "operating mode" is to be understood here as meaning, in particular, operation of a hand machine tool, in particular of a spindle of the hand machine tool, in which the spindle is braked by means of a braking device, with the result that a runon of the spindle such as, for example in the case of an interruption of a power supply to an electric motor, can advantageously be at least largely prevented. During the braking mode, moments of mass inertia of the tool, in particular of a disk-shaped tool, can bring about a relative movement between the tool attached to the spindle, the runoff safety device and a chucking nut which is provided for clamping the tool tight onto the spindle. The relative movement between the tool and the clamping nut can lead to a situation in which the clamping nut is released and can therefore run off from the spindle. The runoff safety device according to the disclosure can advantageously prevent the chucking nut from running off from the spindle in this way, and therefore prevent the tool from becoming detached from the spindle. An "unbalance compensating unit" is to be understood here as meaning, in particular, a unit which is provided for at least substantially reducing, and, in particular, at least substantially compensating, vibrations, in particular vibrations caused by rotation of a body about a rotational axis, by compensating a mass distribution of the body, in particular compensating the mass distribution about the rotational axis. Vibrations during operation, in particular during a rotation, can advantageously be at least substantially prevented by means of the disclosed configuration of the runoff safety device. In addition, wear on rotating components, caused by the vibrations, can advantageously be kept low. As a result, it is possible to achieve a long service life of components and/or hand machine tools which comprise a runoff safety device according to the disclosure.

Furthermore it is proposed that the unbalance compensating unit has at least one unbalance compensating element which is movably mounted in a transfer element of the transfer unit. An "unbalance compensating element" is to be understood here as meaning, in particular, an element which is selectively provided for changing and/or influencing a mass distribution of a rotating body with respect to a rotational axis, with the result that forces occurring as a result of an unbalance can be reduced, in particular compensated. The unbalance compensating unit particularly preferably comprises a multiplicity of unbalance compensating elements which are movably mounted in the transfer element of the transfer unit. When there are different disk-shaped tools which can be attached to the spindle, a number of unbalance compensating elements are respectively dependent on an unbalance caused by the rotation of the respective tool, a diameter of the respective tool, a dimension, in particular a radius, of the unbalance compensating element and a density of the unbalance compensating element used. The expression "mounted . . . in" is to be understood here as, in particular, defining a spatial arrangement. The unbalance compensating element is preferably enclosed by at least two, in particular at least three, sides of the transfer element, viewed in one plane. However, it is also conceivable, in order to reduce an unbalance, for the unbalance compensating element to be integrally formed on the transfer element by means of a frictionally locking, positively locking and/or materially joined connection, with the result that the unbalance compensating element is fixedly connected to the transfer element. The transfer element is preferably formed from a metallic material. As a result, low tolerances, in particular in the case of fabrication of the transfer element, can advantageously be complied with, with the result that a reliable method functioning of the unbalance compensating unit can be ensured. However, it is also conceivable for the transfer element to be formed from another material which appears appropriate to a person skilled in the art. Combining a movable unbalance compensating element or a plurality of unbalance compensating elements with a fixed unbalance compensating element or a plurality of fixed unbalance compensating elements in order to reduce, in particular compensate, an unbalance is also conceivable. A compact configuration of the runoff safety device according to the disclosure can advantageously be achieved.

The unbalance compensating element is advantageously embodied as a roller body. The unbalance compensating element is preferably embodied as a sphere. In the case of a diameter of a tool of approximately 125 mm which can be attached to the spindle, the unbalance compensating unit preferably has at least more than 6 spheres, in particular approximately 7 to 12 spheres. In the case of a diameter of a tool of approximately 230 mm which can be attached to the spindle, the unbalance compensating unit preferably has at least more than 4 spheres and, in particular, approximately 5 to 9 spheres. As a result, the unbalance compensating element can advantageously move into an unbalance position independently when the transfer unit rotates. Adaptation of the unbalance position to changing conditions therefore takes place essentially automatically. However, it is also conceivable for the unbalance compensating element to be embodied in a different form which appears appropriate to a person skilled in the art, such as, for example, a disk etc. By means of an embodiment of the unbalance compensating element as a roller body it is particularly advantageously possible to achieve a low friction unbalance compensating unit. In addition, the unbalance compensating element can advantageously generate a corresponding mass distribution for compensating the unbalance, as a function of a force generated by an unbalance.

In addition, it is proposed that the roller body be guided at least in one raceway which is embodied in one piece with the transfer element. "One piece" is intended to mean, in particular, at least connected in a materially joined fashion, for example by a welding process, a bonding process, an injection molding process, such as, for example, a single-component or multi-component injection method and/or another process which appears appropriate to a person skilled in the art and/or advantageously molded in one piece, such as, for example, from an individual blank. The raceway is particularly preferably arranged concentrically about a rotational axis of the transfer unit. The raceway is formed, in particular, by a depression and/or recess in the transfer element, corresponding to a radius of the unbalance compensating element which is embodied as a sphere. However, it is also conceivable for more than one raceway to be provided in the transfer element, in particular four raceways, with the result that the unbalance compensating element which is embodied as a sphere is surrounded by raceways on at least four sides. This makes it possible to achieve advantageous guidance of the unbalance compensating element in the transfer element.

The unbalance compensating element is preferably movably mounted in a U-shaped groove in the transfer element which extends in a circumferential direction. The circumferential direction extends preferably in a plane which runs perpendicularly with respect to the rotational axis of the transfer unit. In this context, the groove preferably extends concentrically with respect to the rotational axis of the transfer element. Structurally simple integration of the unbalance compensating element into the transfer element can be achieved.

Furthermore it is proposed that the unbalance compensating unit have a closure element which is provided for sealing the groove. A "closure element" is to be understood here, in particular, as meaning an element which has a geometric shape corresponding to a component which is to experience wear, and has an at least partially seal-forming effect. The closure element is preferably formed from a metallic material. However, it is also conceivable for the closure element to be formed from a plastic, in particular from a fiber-reinforced plastic, or from a sintered material or the like. The closure element is particularly preferably arranged on and/or in the transfer element by means of a materially joined connection such as, for example, a bonded connection or welded connection, in particular by means of laser welding, etc. However, it is also conceivable for the closure element to be arranged in a frictionally locking and/or positively locking fashion in the groove, for example by means of chamfering and/or by means of a form fit, wherein the frictionally locking and/or positively locking connection is preferably embodied in such a way that a seal-forming function can be achieved. An arrangement, in particular in contact regions of the closure element and of the groove, of additional seal-forming elements in order to protect the groove against the ingress of dirt, is also conceivable. Through interaction with the closure element, the groove forms, in particular, a cavity in the form of a circular ring for accommodating the unbalance compensating element. The groove, in particular the cavity which comes about through interaction with the seal-forming element, can advantageously be protected against the ingress of dirt, with the result that a functionality of the unbalance compensating unit can advantageously be substantially ensured.

The closure element is advantageously embodied in the form of a circular ring. It is therefore particularly advantageously possible to achieve sealing of the groove by means of the closure element. In addition, by means of an embodiment from an elastic plastic and an embodiment in the form of a circular ring it is advantageously possible to dispense with additional seal-forming elements for sealing the cavity in the form of a circular ring which has come about through interaction of the groove with the closure element. The closure element can be held in the groove, in particular in an accommodating region of the groove, using, for example, a form fit, and advantageously protect the groove against the ingress of dirt.

It is further proposed that the unbalance compensating unit comprises at least one damping element which is arranged in the groove in the transfer element. The damping element is preferably embodied as a damping liquid. Embodying the damping element from an elastomer or other materials which appear appropriate to a person skilled in the art is also conceivable. In one embodiment of the damping element from an elastomer, the damping element forms the raceway of the unbalance compensating element. By means of the damping element it is, in particular, advantageously possible to achieve a damped response behavior of the unbalance compensating element with the result that, in particular in the case of an embodiment of the unbalance compensating element as a sphere, rolling can be at least partially delayed and/or damped in order to compensate an unbalance. In addition, vibrations of the moving unbalance compensating element can advantageously be damped.

The transfer unit can preferably be coupled to the spindle in a removable fashion. "In a removable fashion" is intended to mean here, in particular, decoupling of the transfer unit from the spindle, wherein a functionality of the transfer unit, in particular a relative movement between a first transfer element and a second transfer element, is maintained in an uncoupled state. By virtue of the removability of the transfer unit it is particularly advantageously possible to achieve a high degree of flexibility and therefore a large field of use for the runoff safety device according to the disclosure.

The disclosure is also based on a hand machine tool, in particular an angle grinder, having a runoff safety device according to the disclosure. As a result it is advantageously possible to make available a hand machine tool with low vibrations during operation. It is therefore advantageously possible to achieve a high level of comfort.

BRIEF DESCRIPTION OF THE DRAWINGS

Further advantages emerge from the following description of the drawing. Exemplary embodiments of the disclosure are illustrated in the drawing. The drawing and the description contain numerous features in combination. A person skilled in the art will also advantageously consider the features individually and combine them to form further appropriate combinations.

In the drawings:

FIG. 3 shows a view of a detail of the runoff safety device according to the disclosure in a tool-side view, FIG. 4 shows a view of a detail of the runoff safety device according to the disclosure in a machine-side view.

DETAILED DESCRIPTION

Figure 1:
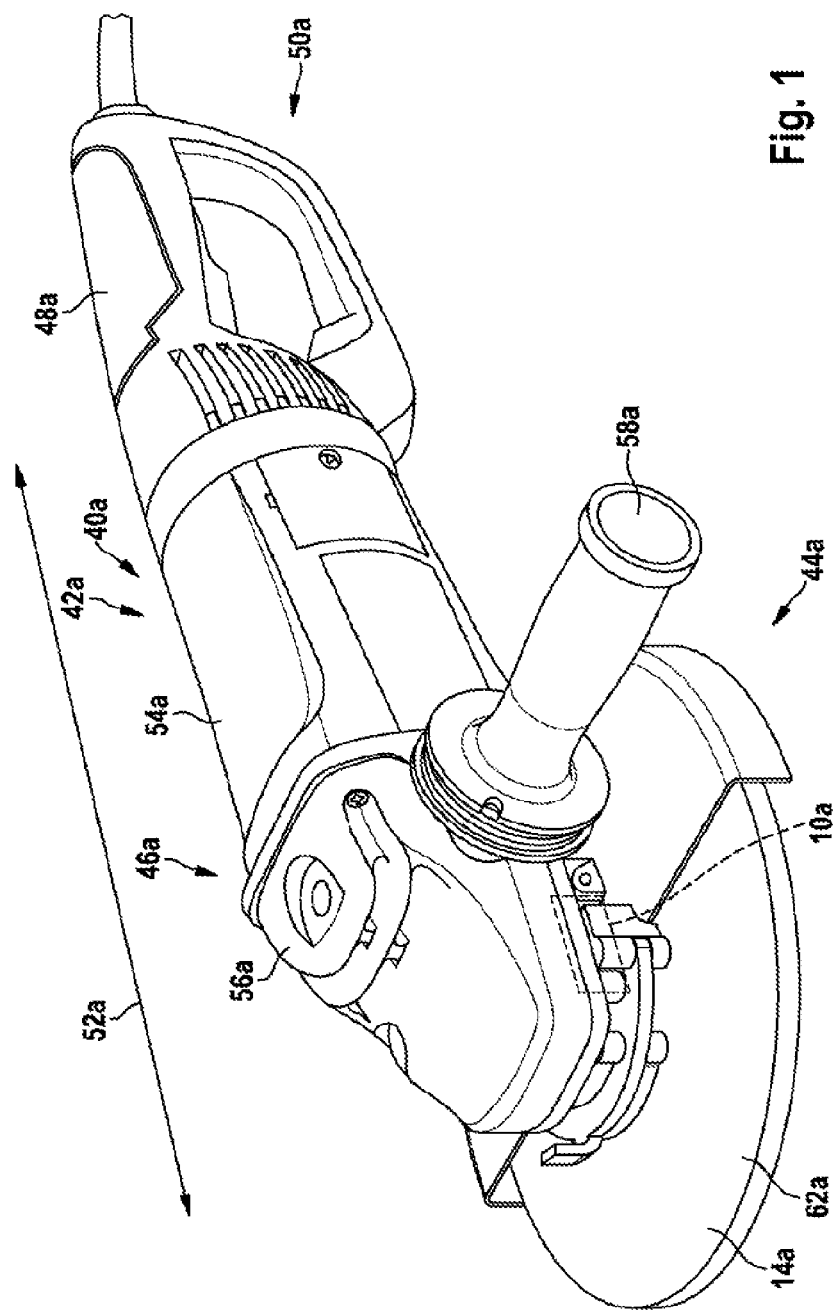
FIG. 1 shows a hand machine tool having a runoff safety device according to the disclosure in a schematic illustration.

FIG. 1 shows a hand machine tool 42a which is embodied as an angle grinder 40a and has a runoff safety device 10a according to the disclosure, in a schematic illustration. The runoff safety device 10a is embodied here as a hand machine tool runoff safety device. The angle grinder 40a comprises a protection hood unit 44a, a hand machine tool housing 46a and a main hand grip 48a, which extends on a side 50a facing away from a tool 14a, in the direction of a main extent 52a of the angle grinder 40a. The hand machine tool housing 46a comprises a motor housing 54a for accommodating an electric motor (not illustrated in more detail here) and a transmission housing 56a for mounting a transmission (not illustrated here in more detail). An additional hand grip 58a is arranged on the transmission housing 56a. The additional hand grip 58a extends transversely with respect to the direction of the main extent 52a of the angle grinder 40a.

Figure 2:
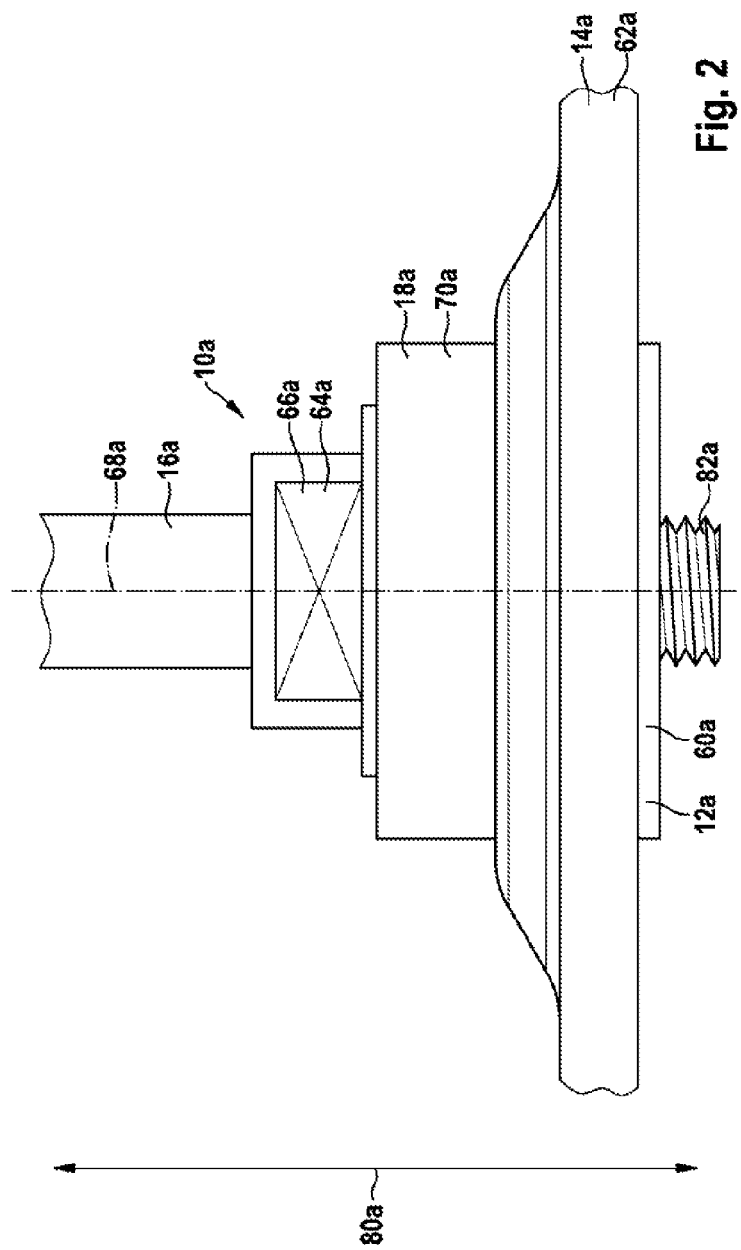
FIG. 2 shows a view of a detail of a spindle of the hand machine tool from FIG. 1 with the runoff safety device according to the disclosure arranged on the spindle, in a schematic illustration.

FIG. 2 shows a view of a detail of a spindle 16a of the hand machine tool 42a which is embodied as an angle grinder 40a and has the runoff safety device 10a arranged on the spindle 16a, in a schematic illustration. The spindle 16a extends essentially perpendicularly with respect to the direction of the main extent 52a from the transmission housing 56a (not illustrated here in more detail). The runoff safety device 10a for preventing running off of a chucking element 12a, embodied as a chucking nut 60a, and/or of the tool 14a, embodied as a cutting wheel 62a, from the spindle 16a is arranged on the spindle 16a. However, it is conceivable for the tool 14a to be embodied as a grinding disk or polishing disk. The spindle 16a has, for the purpose of accommodating the runoff safety device 10a, two flattened portions 64a on an external circumference, said flattened portions 64a being arranged diametrically and therefore forming a 2-sided arrangement 66a. In this context, just one of the flattened portions 64a is illustrated in FIG. 2. The external circumference of the spindle 16a is arranged in a plane which extends substantially perpendicularly with respect to a rotational axis 68a of the spindle 16a. The spindle 16a is driven in rotation about the rotational axis 68a by means of the transmission (not illustrated) and by means of the electric motor (not illustrated) of the angle grinder 40a. In one working mode of the angle grinder 40a, the spindle 16a is driven in rotation in the clockwise direction viewed from the angle grinder 40a. In this context, the runoff safety device 10a is likewise driven in rotation in the clockwise direction in a mounted state.

The runoff safety device 10a comprises a transfer unit 18a which is embodied as a receptacle flange 70a and which can be coupled to the spindle 16a in a removable fashion. The transfer unit 18a comprises a first transfer element 26a and a second transfer element 72a which can be moved relative to the first transfer element 26a (FIGS. 3 and 4). The first transfer element 26a is connected in a positively locking fashion to the spindle 16a in a mounted state of the runoff safety device 10a in order to transfer torque. For this purpose, the first transfer element 26a has a driving contour 74a which is configured to correspond to the 2-sided arrangement 66a of the spindle 16a (FIG. 4). However, it is also conceivable for the spindle 16a to be of conical configuration in a receptacle area for the first transfer element 26a, and for the first transfer element 26a to have a receptacle opening which corresponds to the conical configuration, with the result that in a mounted state a conical seat is formed between the spindle 16a and the first transfer element 26a.

Figure 5:
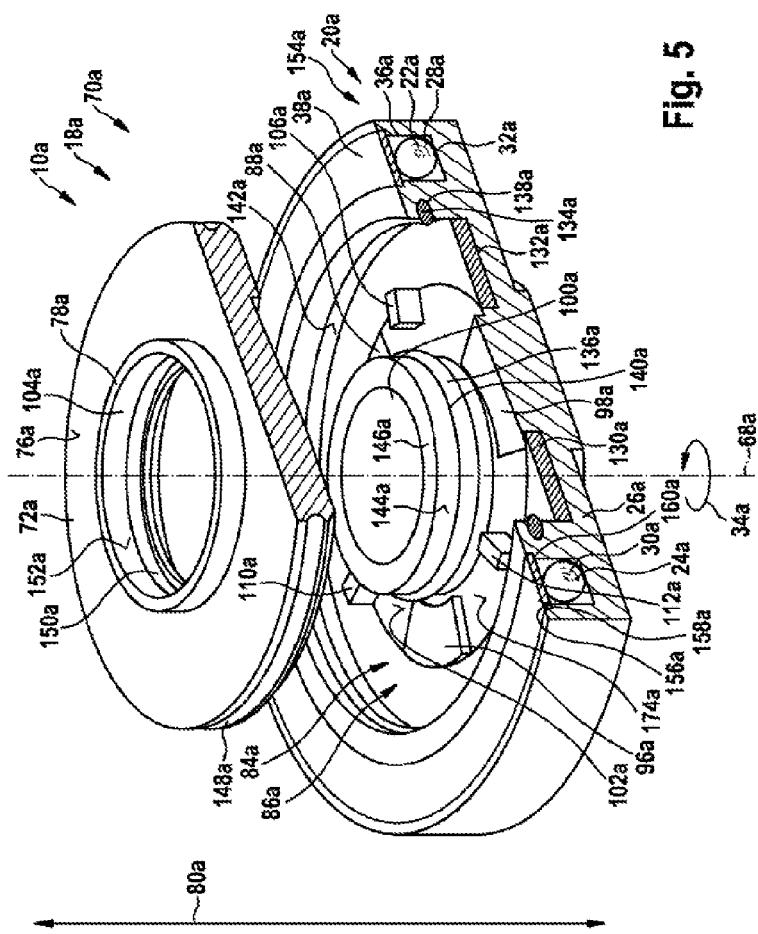
FIG. 5 shows a perspective view of a detail of the runoff safety device according to the disclosure in an opened state with a section along the line V-V from FIG. 3.

The second transfer element 72a is embodied in the form of a disk and has a bearing face 76a for the tool 14a, embodied as a cutting wheel 62a, to bear on. Furthermore, the second transfer element 72a has an annular collar 78a which is provided for accommodating the tool 14a (FIGS. 3 and 5). For this purpose, the tool 14a has a central opening which is embodied as a bore (not illustrated in more detail here) and which is fitted onto the collar 78a of the second transfer element 72a in order to mount the tool 14a, with the result that the tool 14a bears against the bearing face 76a of the second transfer element 72a. The bearing face 76a of the second transfer element 72a and a side of the tool 14a which bears against the bearing face 76a have in this context an adhesive coating (not illustrated here in more detail), with the result that friction between the bearing face 76a of the second transfer element 72a and the side of the tool 14a bearing against the bearing face 76a is high. However, it is also conceivable that the bearing face 76a and the side of the tool 14a which bears against the bearing face 76a have a corresponding, ramp-like geometry, said geometries engaging one in the other. Other measures and refinements of the bearing face 76a, and of the side of the tool 14a which bears against the bearing face 76a, which increase friction and which appear appropriate to a person skilled in the art are likewise conceivable.

When the tool 14a is mounted, the tool 14a is fitted with the central opening onto the spindle 16a in an axial direction 80a until the tool 14a bears on the bearing face 76a of the second transfer element 72a of the transfer unit 18a, already arranged on the spindle 16a, of the runoff safety device 10a. The chucking element 12a which is embodied as a chucking nut is subsequently screwed with an internal thread (not illustrated here in more detail) of the chucking element 12a onto a thread 82a of the spindle 16a. In the process, the tool 14a is clamped onto the spindle 16a together with the transfer unit 18a, wherein the transfer unit 18a is supported on the spindle 16a by the first transfer element 26a. A torque can be transmitted from the spindle 16a to the tool 14a by means of the clamping of the tool 14a between the chucking element 12a and the transfer unit 18a on the spindle 16a during working mode of the angle grinder 40a. In the working mode of the angle grinder 40a, the tool 14a is driven in rotation in the clockwise direction viewed from the angle grinder 40a. In the working mode of the angle grinder 40a, a clamping force of the chucking element 12a is maintained by rotating the tool 14a and friction between the chucking element 12a and a side of the tool 14a which bears against the chucking element 12a continues to be ensured via a pitch of the thread 82a of the spindle 16a and the internal thread of the chucking element 12a.

The angle grinder 40a also comprises a brake device (not illustrated in more detail here) for preventing the spindle 16a from running on during a switching off process of the angle grinder 40a, such as, for example, by means of an interruption in a power supply. During the switching off process, the angle grinder 40a switches into a braking mode and brakes the spindle 16a by means of the brake device. In the braking mode, the tool 14a moves further in the clockwise direction or further about the rotational axis 68a of the spindle 16a owing to mass inertia, with the result that a difference in torque is produced between the tool 14a, the spindle 16a, the transfer unit 18a and the chucking element 12a. This difference in torque brings about a relative movement between the tool 14a, the transfer unit 18a and the chucking element 12a.

Owing to friction between the chucking element 12a and the inert tool 14a, the chucking element 12a is rotated along with the tool 14a counter to a rotational direction generated in the working mode of the angle grinder 40a, with the result that a thread prestress which is generated by the pitch of the internal thread of the chucking element 12a and the thread 82a of the spindle 16a can be released. As a result, the chucking element 12a can be released over an entire thread length of the thread 82a of the spindle 16a, and the chucking element 12a can run off from the spindle 16a together with the tool 14a.

In order to prevent the runoff of the chucking element 12a and/or of the tool 14a, the transfer unit 18a which is embodied as an accommodating flange 70a has a movement changing unit 84a which is provided for transferring a first relative movement between the first transfer element 26a and the second transfer element 72a into a relative movement in the braking mode (FIG. 5). In this context, the first relative movement between the first transfer element 26a and the second transfer element 72a is a rotation about the rotational axis 68a. The second relative movement between the first transfer element 26a and the second transfer element 72a is a translation in the axial direction 80a. The rotation between the first transfer element 26a and the second transfer element 72a comes about during the braking mode from the torque difference between the tool 14a and the transfer unit 18a. The tool 14a entrains the second transfer element 72a in rotation as a result of the friction which comes about between the tool 14a and the bearing face 76a of the second transfer element 72a, wherein the first transfer element 26a is connected in a positively locking fashion to the 2-sided arrangement 66a of the spindle 16a by means of the driving contour 74a. The second transfer element 72a is movably mounted here in the first transfer element 26a which is embodied in the form of a pot. The second transfer element 72a is mounted so as to be movable in a circumferential direction 34a and in the axial direction 80a in the first transfer element 72a.

Figure 6:
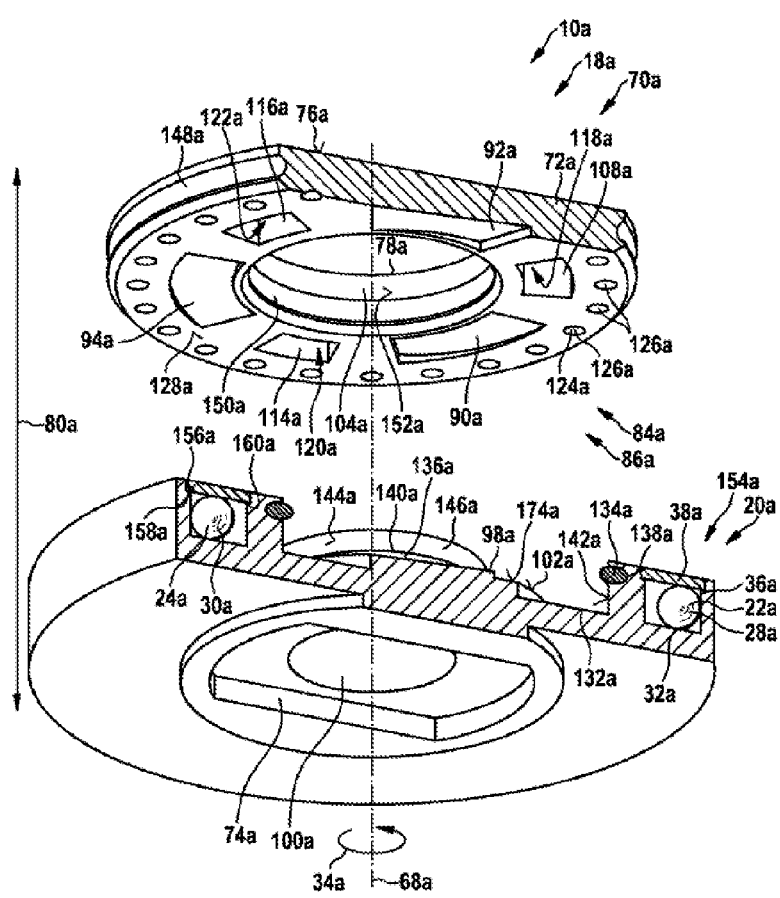
FIG. 6 shows a further perspective view of a detail of the runoff safety device according to the disclosure in an opened state with a section along the line V-V from FIG. 3.

The movement changing unit 84a is embodied as a stroke unit 86a which is provided for moving the second transfer element 72a in the axial direction 80a relative to the first transfer element 26a owing to the first relative movement, in particular the rotation. The stroke unit 86a has a first stroke element 88a which is embodied in one piece with the first transfer element 26a. The first stroke element 88a is embodied in the form of a ramp. In addition, the stroke unit 86a has a second stroke element 90a which, owing to the first relative movement or the rotation of the second transfer element 72a relative to the first transfer element 26a, generates the second relative movement or the translation of the second transfer element 72a relative to the first transfer element 26a by means of interaction with the first stroke element 88a. The second stroke element 90a is also embodied in the form of a ramp and is embodied in one piece with the second transfer element 72a (FIG. 6). Overall, the second transfer element 72a has three second stroke elements 90a, 92a, 94a. The first transfer element 26a has a total of three first stroke elements 88a, 96a, 98a which correspond to the three second stroke elements 90a, 92a, 94a of the second transfer element 72a. However, it is also conceivable to provide a larger or smaller number than three stroke elements 88a, 90a, 92a, 94a, 96a, 98a on the first transfer element 26a and the second transfer element 72a. A person skilled in the art will decide, depending on the requirement, which number of stroke elements 88a, 90a, 92a, 94a, 96a, 98a on the first transfer element 26a and the second transfer element 72a appears appropriate.

The first stroke elements 88a, 96a, 98a extend in a uniformly distributed fashion over a circular ring of 360° of the first transfer element 26a, in each case along an angular range between 30° and 60° about a central opening 100a in the first transfer element 26a, which opening 100a is provided for accommodating the spindle 16a. The central opening 100a is embodied here as a drilled locating hole. The first stroke elements 88a, 96a, 98a have a pitch which extends from a starting point arranged on an inner face 102a in the direction of an end point which is arranged in a plane which is parallel to the inner face 102a. In a mounted state of the first transfer element 26a, the plane is arranged starting from the spindle 16a in the direction of the mounted tool 14a, spaced apart from the inner face 102a.

The second stroke elements 90a, 92a, 94a extend in a uniformly distributed fashion on a circular ring of 360° of the second transfer element 72a, in each case along an angular range between 30° and 60° about a central opening 104a of the second transfer element 72a, which is provided for accommodating the spindle 16a (FIG. 6). In a mounted state of the transfer unit 18a, the second stroke elements 90a, 92a, 94a point in the direction of the inner face 102a of the first transfer element 26a. The second stroke elements 90a, 92a, 94a have a pitch which corresponds to the first stroke elements 88a, 96a, 98a. The pitch of the first stroke elements 88a, 96a, 98a and of the second stroke elements 90a, 92a, 94a is of the same magnitude here or larger than a pitch of the thread 82a of the spindle 16a or of the internal thread of the chucking element 12a. In a clamped state of the tool 14a, the second stroke elements 90a, 92a, 94a bear against the first stroke elements 88a, 96a, 98a. During the rotation of the second transfer element 72a relative to the first transfer element 26a owing to braking of the spindle 16a in the braking mode, the second stroke elements 90a, 92a, 94a slide on the first stroke elements 88a, 96a, 98a. As a result, an axial stroke of the second transfer element 72a relative to the first transfer element 26a is generated in the axial direction 80a. This axial stroke generates a chucking force in the direction of the tool 14a and of the chucking element 12a, with the result that running off of the chucking element 12a and/or the tool 14a from the spindle 16a can be prevented.

The runoff safety device 10a comprises at least one stop element 106a which is provided for limiting the first relative movement between the first transfer element 26a and the second transfer element 72a or the rotation of the second transfer element 72a relative to the first transfer element 26a (FIG. 5). The stop element 106a is arranged on the inner face 102a, by a side 174a facing the second transfer element 72a, of the first transfer element 26a. The second transfer element 72a has here at least one recess 108a (FIG. 6) which is provided for accommodating the stop element 106a in a mounted state of the transfer unit 18a. Overall, the runoff safety device 10a comprises three stop elements 108a, 110a, 112a which are embodied in one piece with the first transfer element 26a, and three recesses 108a, 114a, 116a which are embodied in one piece with the second transfer element 72a. However, it is conceivable to provide a larger or smaller number than three stop elements and three recesses 108a, 114a, 116a. Depending on the requirement, the person skilled in the art will decide what number of stop elements 106a, 110a, 112a and what number of recesses 108a, 114a, 116a appear appropriate.

The three stop elements 106a, 110a, 112a are distributed uniformly along the circular ring of 360° of the first transfer element 26a, spaced apart from one another and arranged spaced apart from the three first stroke elements 88a, 96a, 98a of the first transfer element 26a. In addition, the three stop elements 106a, 110a, 112a have axial extents which run in the axial direction 80a. The axial extents are selected here such that the three stop elements 106a, 110a, 112a extend at least into the three recesses 108a, 114a, 116a of the second transfer element 72a in a mounted state of the transfer unit 18a. The three recesses 108a, 114a, 116a extend on the circular ring of 360° of the second transfer element 72a in each case in a uniformly distributed fashion along an angular range between 15° and 30°, and are arranged spaced apart from one another and from the second stroke elements 90a, 92a, 94a about the central opening 104a in the second transfer element 72a.

The stop elements 106a, 110a, 112a limit the rotation between the first transfer element 26a and the second transfer element 72a to an angular range which is defined by a dimension of the recesses 108a, 114a, 116a and a dimension of the stop elements 106a, 110a, 112a. As a result, desired release of the chucking element 12a is made possible, for example when a tool change occurs. If the chucking element 12a is rotated counter to the rotational direction in the working mode, the second transfer element 72a is rotated relative to the first transfer element 26a until the stop elements 106a, 110a, 112a of the first transfer element 26a abut against edge regions 118a, 120a, 122a of the recesses 108a, 114a, 116a of the second transfer element 72a. The second transfer element 72a is fixedly coupled to the first transfer element 26a by means of the abutting or bearing of the stop elements 106a, 110a, 112a against the edge regions 118a, 120a, 122a of the recesses 108a, 114a, 116a. A torque which is generated by unscrewing the chucking element 12a is supported on the 2-sided arrangement 66a of the spindle 16a via the driving contour 74a, and the chucking element 12a can be released and unscrewed from the spindle 16a.

Furthermore, the runoff safety device 10a comprises at least one lubricant accommodating space 124a for accommodating lubricant for reducing friction during the first relative movement between the first transfer element 26a and the second transfer element 72a. The lubricant accommodating space 124a is formed by a lubricant pocket 126a. Overall, a plurality of lubricant pockets 126a are arranged spaced uniformly apart from one another along a circular ring about the central opening 104a in the second transfer element 72a (FIG. 6). The lubricant pockets 126a are arranged in a side 128a, facing away from the bearing face 76a, of the second transfer element 72a. In addition, lubricant pockets (not illustrated in any more detail here) are also arranged in the ramp-like first stroke elements 88a, 96a, 98a and in the ramp-like second stroke elements 90a, 92a, 94a, with the result that a slight frictional resistance comes about during sliding of the ramp-shaped first stroke elements 88a, 96a, 98a on the ramp-shaped second stroke elements 90a, 92a, 94a, during rotation of the second transfer element 72a relative to the first transfer element 26a.

Furthermore, the first transfer element 26a has a bearing element 130a which is arranged in a recess 132a in the shape of a circular ring in the inner face 102a of the first transfer element 26a. The bearing element 130a is embodied here as a sliding bearing. However, it is also conceivable for the bearing element 130a to be embodied as a roller bearing in one alternative embodiment. A plurality of lubricant pockets (not illustrated here in more detail) for accommodating lubricant are likewise arranged uniformly spaced apart from one another in the recess 132a in the shape of a circular ring.

The transfer unit 18a also has a first sealing element 134a and a second sealing element 136a which are provided for protecting the transfer unit 18a against the ingress of dirt from external surroundings and for preventing lubricant from escaping from the inside. The first sealing element 134a is arranged here in a first groove 138a of the first transfer element 26a, and the second sealing element 136a is arranged in a second groove 140a of the first transfer element 26a (FIG. 5). The first groove 138a is arranged in a side face 142a of the first transfer element 26a. The side face 142a extends essentially perpendicularly with respect to the inner face 102a of the first transfer element 26a and along an entire circumference of the first transfer element 26a facing the second transfer element 72a and running in a plane parallel to the inner face 102a. The second groove 140a is arranged in a side 144a, facing the side face 142a, of a hollow cylinder 146a surrounding the central opening 100a. The first sealing element 134a is pressed in a precisely fitting fashion into the first groove 138a, and the second sealing element 136a is pressed in a precisely fitting fashion into the second groove 140a.

The second transfer element 72a has a first sealing element receptacle 148a which corresponds to the first groove 138a in the first transfer element 26a. The first sealing element receptacle 148a is arranged along an outer circumference of the second transfer element 72a and extends along the entire outer circumference. The outer circumference of the second transfer element 72a runs in a plane which extends parallel to the bearing face 76a. In this context, the first sealing element receptacle 148a has an extent in the axial direction 80a which is greater than an extent of the first sealing element 134a in the axial direction 80a. As a result, a sealing function during an axial stroke of the second transfer element 72a relative to the first transfer element 26a is ensured.

In addition, the second transfer element 72a has a second sealing element receptacle 150a which corresponds to the second groove 140a in the first transfer element 26a. The second sealing element receptacle 150a is arranged in an inner side 152a of the central opening 104a in the second transfer element 72a and extends along an entire circumference of the central opening 104a. The circumference of the central opening 104a runs in a plane which extends parallel to the bearing face 76a of the second transfer element 72a. The second sealing element receptacle 150a has an extent in the axial direction 80a which is greater than an extent of the second sealing element 136a in the axial direction 80a. This also ensures a sealing function during an axial stroke of the second transfer element 72a relative to the first transfer element 26a. The first transfer element 26a and the second transfer element 72a are connected to one another and secured axially by means of the first sealing element 134a and the second sealing element 136a.

The runoff safety device 10a also has an unbalance compensating unit 20a which is provided for reducing an unbalance of the transfer unit 18a in a working mode of the angle grinder 40a in a mounted state of the transfer unit 18a on the spindle 16a. During a rotation of the tool 14a and/or of the runoff safety device 10a about the rotational axis 68a, vibrations can occur as a result of unbalances. These vibrations are reduced, and preferably compensated, by means of the unbalance compensating unit 20a. The unbalance compensating unit 20a has in this context unbalance compensating elements 22a, 24a which are movably mounted in the first transfer element 26a of the transfer unit 18a (only two are illustrated in the figures for the purpose of illustration). The unbalance compensating elements 22a, 24a are movably mounted in a U-shaped groove 36a, extending in the circumferential direction 34a, in the first transfer element 26a. The groove 36a extends through 360° in the circumferential direction 34a in the first transfer element 26a.

The unbalance compensating elements 22a, 24a are embodied as roller bodies 28a, 30a. The roller bodies 28a, 30a are guided in a raceway 32a which is embodied in one piece with the first transfer element 26a. The raceway 32a is arranged here in the groove 36a in the first transfer element 26a. In addition, the raceway 32a likewise extends through 360° in the groove 36a in the circumferential direction 34a. The unbalance compensating unit 20a also comprises a closure element 38a which is provided for closing off and/or sealing the groove 36a. The closure element 38a is embodied in the form of a circular ring. In addition, in a mounted state the closure element 38a is arranged in a plane parallel to the inner face 102a of the first transfer element 26a. The first transfer element 26a has an accommodating area 154a for accommodating the closure element. The accommodating area 154a is arranged on a side 156a of the groove 36a which faces the tool 14a in a mounted state of the transfer unit 18a. In this context, the accommodating area is formed by two step-shaped shoulders 158a, 160a in the groove which lie opposite one another. Another embodiment of the accommodating area which appears appropriate to the person skilled in the art is also conceivable.

The groove 36a which is closed off by means of the closure element 38a therefore forms a cavity in the form of a circular ring in which the unbalance compensating elements 22a, 24a are arranged. The unbalance compensating elements 22a, 24a can move in the circumferential direction 34a within the cavity in the form of a circular ring guided by the raceway 32a. In a state of rest, the unbalance compensating elements 22a, 24a are arranged essentially bearing one against the other in the cavity in the form of a circular ring in the circumferential direction 34a along an angular range of less than 200°. The cavity in the form of a circular ring is also filled by means of a damping element, embodied as a damping liquid, of the unbalance compensating unit 20a. The damping element is provided for damping vibrations of the unbalance compensating elements 22a, 24a and achieving a delayed reaction of the unbalance compensating elements 22a, 24a during starting of a rotation of the runoff safety device 10a about the rotational axis 68a. When a rotation of the runoff safety device 10a starts at the beginning of a working mode of the angle grinder 40a, the unbalance compensating elements 22a, 24a are moved in the circumferential direction 34a in the cavity in the form of a circular ring until the unbalance compensating elements 22a, 24a have assumed an unbalance position. The unbalance compensating elements 22a, 24a compensate, in the working mode, for example an unbalance which is caused by abrasion at the tool 14a and/or an unbalance which is caused by fabrication. In this context, the unbalance compensating elements 22a, 24a generate, in the unbalance position, a force which is opposed to the unbalance. The force which is opposed to the unbalance is generated by means of the movable unbalance compensating elements 22a, 24a as a result of a changed mass distribution of the runoff safety device 10a.

Figure 7:
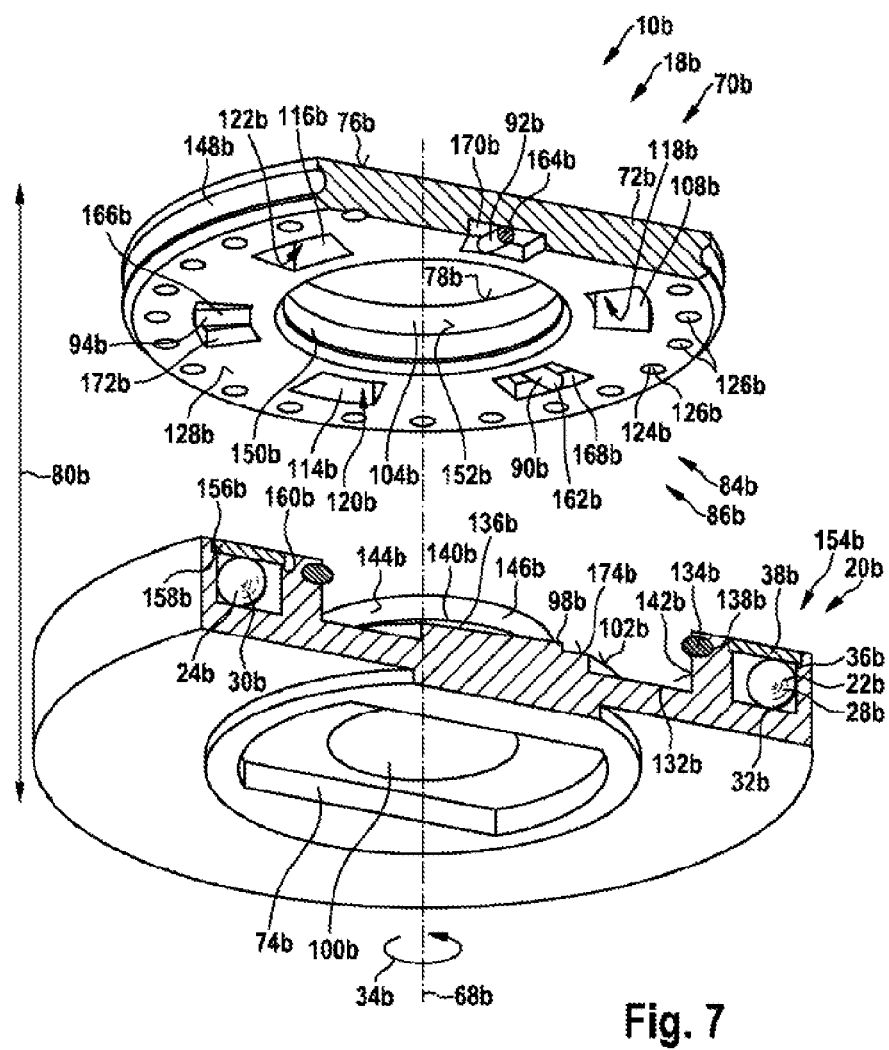
FIG. 7 shows a perspective view of a detail of an alternative runoff safety device according to the disclosure in an opened state with an analog section along the line V-V from FIG. 3.

FIG. 7 illustrates a second alternative exemplary embodiment. Components, features and functions which remain essentially the same are basically provided with the same reference symbols. In order to differentiate between the exemplary embodiments, the letters a and b are added to the reference symbols in the exemplary embodiments. The following description is restricted essentially to the differences from the first exemplary embodiment in FIGS. 1 to 6, wherein it is possible to refer to the description of the first exemplary embodiment in FIGS. 1 to 6 for components, features and functions which remain the same.

FIG. 7 shows a perspective view of a detail of an alternative runoff safety device 10b according to the disclosure in an opened state with an analogous section along the line V-V from FIG. 3. The runoff safety device 10b can be arranged here on a spindle 16b of an angle grinder 44a which is shown in FIG. 1. The runoff safety device 10b comprises a transfer unit 18b which can be coupled to the spindle 16b in a removable fashion. The transfer unit 18b comprises a first transfer element 26b and a second transfer element 72b which can be moved relative to the first transfer element 26b. Furthermore, the transfer unit 18b comprises a movement changing unit 84b which is embodied as a stroke unit 86b and which is provided for transferring, in a braking mode, at least partially a first relative movement between the first transfer element 26b and the second transfer element 72b into a second relative movement.

The stroke unit 86b has a first ramp-shaped stroke element 88b which is embodied in one piece with the first transfer element 26b. Overall, the stroke unit 86b has three first stroke elements 88b, 96b, 98b which are embodied in one piece with the first transfer element 26b. In addition, the stroke unit 86b has at least one second stroke element 90b which is arranged on a side 128b, facing away from a bearing face 76b, of the second transfer element 72b. Overall, the stroke unit 86b has three second stroke elements 90b, 92b, 94b. The second stroke elements 90b, 92b, 94b are embodied as roller bodies 162b, 164b, 166b. The roller bodies 162b, 164b, 166b are arranged in recesses 168b, 170b, 172b in the side 128b, facing away from the bearing face 76b, of the second transfer element 72b. The recesses 168b, 170b, 172b are arranged distributed uniformly along a circular ring and spaced apart from one another in the second transfer element 72b. The roller bodies 162b, 164b, 166b of the second transfer element 72b corresponds to the ramp-shaped first stroke elements 88b, 96b, 98b of the first transfer element 26b. It is however conceivable that in one alternative embodiment the first stroke elements 88b, 96b, 98b are embodied in one piece with the second transfer element 72b and the roller bodies 162b, 164b, 166b are arranged on the first transfer element 26b.

In one rotation of the second transfer element 72b relative to the first transfer element 26b owing to braking of the spindle 16b in a braking mode of the angle grinder 40b, the roller bodies 162b, 164b, 166b roll along the ramp-shaped first stroke elements 88b, 96b, 98b and therefore generate an axial stroke in an axial direction 80b of the second transfer element 72b relative to the first transfer element 26b.

The runoff safety device 10b also has an unbalance compensating unit 20b which is provided for reducing an unbalance of the transfer unit 18b in a working mode of the angle grinder 40b in a mounted state of the transfer unit 18b on the spindle 16b. During a rotation of a tool 14b and/or of the runoff safety device 10b about the rotational axis 68b, vibrations can occur as a result of unbalances. These vibrations are reduced and are preferably compensated by means of the unbalance compensating unit 20b. The unbalance compensating unit 20b has in this context unbalance compensating elements 22b, 24b which are movably mounted in the first transfer element 26b of the transfer unit 18b (only two are illustrated in the figures for the purpose of illustration). The unbalance compensating elements 22b, 24b which are embodied as roller bodies 28b, 30b are movably mounted in a U-shaped groove 36b, extending in the circumferential direction 34b, in the first transfer element 26b. The groove 36b extends through 360° in the circumferential direction 34b in the first transfer element 26b. The unbalance compensating elements 22b, 24b can therefore roll in the groove in order to compensate an unbalance and move in the circumferential direction 34b within the groove.

The invention claimed is:
1. A runoff safety device comprising:
  at least one transfer unit that includes
    a first transfer element;
    a second transfer element that is movable relative to the first transfer element; and a motion changing unit configured to, in a braking mode, transfer a first relative motion between the first transfer element and the second transfer element into a second relative motion between the first transfer element and the second transfer element in order to prevent runoff of at least one of a chucking element and a tool from a spindle in the braking mode; and an unbalance compensating unit that is movably mounted in or on the first transfer element, and that is configured to at least reduce an unbalance of the at least one transfer unit during operation.

2. The runoff safety device as claimed in claim 1, wherein the unbalance compensating unit has at least one unbalance compensating element movably mounted in the first transfer element of the at least one transfer unit.

3. The runoff safety device as claimed in claim 2, wherein the at least one unbalance compensating element is a roller body.

4. The runoff safety device as claimed in claim 3, wherein the roller body is guided at least in one raceway formed in one piece with the first transfer element.

5. The runoff safety device as claimed in claim 2, wherein the at least one unbalance compensating element is movably mounted in a U-shaped groove extending in a circumferential direction in the first transfer element.

6. The runoff safety device as claimed in claim 5, wherein the unbalance compensating unit has a closure element configured to seal the groove.

7. The runoff safety device as claimed in claim 6, wherein the closure element is a circular ring.

8. The runoff safety device as claimed in claim 5, wherein the unbalance compensating unit includes at least one damping element arranged in the groove in the first transfer element.

9. The runoff safety device as claimed in claim 1, wherein the transfer unit is configured to be coupled to the spindle in a removable fashion.

10. A hand machine tool, comprising:
a runoff safety device including:
at least one transfer unit that includes
a first transfer element;
a second transfer element that is movable relative to the first transfer element; and
a motion changing unit configured to, in a braking mode, transfer a first relative motion between the first transfer element and the second transfer element into a second relative motion between the first transfer element and the second transfer element in order to prevent runoff of at least one of a chucking element and a tool from a spindle in the braking mode; and
an unbalance compensating unit that is movably mounted in or on the first transfer element, and that is configured to at least reduce an unbalance of the at least one transfer unit during operation.

11. The runoff safety device as claimed in claim 5, further comprising a liquid damping element arranged in the U-shaped groove so as to surround the at least one unbalance compensating element.

* * * * *